(12) United States Patent
Kim et al.

(10) Patent No.: US 10,604,693 B2
(45) Date of Patent: Mar. 31, 2020

(54) HIGH WATER AND BRINE SWELL ELASTOMERIC COMPOSITIONS AND METHOD FOR MAKING AND USING SAME

(71) Applicant: Weatherford Technology Holdings, LLC, Houston, TX (US)

(72) Inventors: Byong Jun Kim, Houston, TX (US); Deborah Lynn Banta, Houston, TX (US); William David Breach, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 14/033,660

(22) Filed: Sep. 23, 2013

(65) Prior Publication Data

US 2014/0087977 A1  Mar. 27, 2014

Related U.S. Application Data

(60) Provisional application No. 61/705,549, filed on Sep. 25, 2012.

(51) Int. Cl.
| | |
|---|---|
| C09K 8/50 | (2006.01) |
| C09K 8/42 | (2006.01) |
| C09K 8/80 | (2006.01) |

(52) U.S. Cl.
CPC ............ *C09K 8/50* (2013.01); *C09K 8/42* (2013.01); *C09K 8/422* (2013.01); *C09K 8/80* (2013.01)

(58) Field of Classification Search
CPC . C09K 8/42; C09K 8/422; C09K 8/50; C09K 8/80
See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 2,805,958 A | 7/1959 | Bueche et al. | 106/308 |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |

(Continued)

FOREIGN PATENT DOCUMENTS

| | | | |
|---|---|---|---|
| CA | 2125513 | 1/1995 | |
| DE | 4027300 | 5/1992 | B10D 53/14 |

(Continued)

OTHER PUBLICATIONS

PCT ISR and Written Opinion dated Dec. 26, 2013.

*Primary Examiner* — Alicia Bland
(74) *Attorney, Agent, or Firm* — Vorys, Sater, Seymour and Pease LLP

(57) ABSTRACT

Swellable compositions including at least one curable elastomer, a least one cure system, at least one high molecular weight (HMW) swelling agent and at least one low molecular weight (LMW) swelling agent. Methods for making swellable compositions including at least one curable elastomer, a least one cure system, at least one high molecular weight (HMW) swelling agent and at least one low molecular weight (LMW) swelling agent. Methods for using swellable compositions including at least one curable elastomer, a least one cure system, at least one high molecular weight (HMW) swelling agent and at least one low molecular weight (LMW) swelling agent.

13 Claims, 8 Drawing Sheets

(56) References Cited

U.S. PATENT DOCUMENTS

| | | | |
|---|---|---|---|
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |
| 3,990,978 A | 11/1976 | Hill | 507/235 |
| 4,007,792 A | 2/1977 | Meister | 166/308.2 |
| 4,052,159 A | 10/1977 | Fuerst et al. | |
| 4,067,389 A | 1/1978 | Savins | 166/246 |
| 4,108,782 A | 8/1978 | Thompon | 507/205 |
| 4,112,050 A | 9/1978 | Sartori et al. | 423/223 |
| 4,112,051 A | 9/1978 | Sartori et al. | 423/223 |
| 4,112,052 A | 9/1978 | Sartori et al. | 423/223 |
| 4,113,631 A | 9/1978 | Thompson | 507/202 |
| 4,378,845 A | 4/1983 | Medlin et al. | 166/297 |
| 4,385,935 A | 5/1983 | Skjeldal | 106/607 |
| 4,461,716 A | 7/1984 | Barbarin et al. | 252/307 |
| 4,479,041 A | 10/1984 | Fenwick et al. | 200/81 R |
| 4,506,734 A | 3/1985 | Nolte | 166/308.1 |
| 4,514,309 A | 4/1985 | Wadhwa | 507/211 |
| 4,541,935 A | 9/1985 | Constien et al. | 507/225 |
| 4,549,608 A | 10/1985 | Stowe et al. | 166/280.1 |
| 4,561,985 A | 12/1985 | Glass, Jr. | 507/108 |
| 4,623,021 A | 11/1986 | Stowe | 166/250.1 |
| 4,654,266 A | 3/1987 | Kachnik | 428/403 |
| 4,657,081 A | 4/1987 | Hodge | 166/380.5 |
| 4,660,643 A | 4/1987 | Perkins | 166/283 |
| 4,683,068 A | 7/1987 | Kucera | 507/201 |
| 4,686,052 A | 8/1987 | Baranet et al. | 507/244 |
| 4,695,389 A | 9/1987 | Kubala | 507/244 |
| 4,705,113 A | 11/1987 | Perkins | 166/302 |
| 4,714,115 A | 12/1987 | Uhri | 166/308.1 |
| 4,718,490 A | 1/1988 | Uhri | 166/281 |
| 4,724,905 A | 2/1988 | Uhri | 166/250.1 |
| 4,725,372 A | 2/1988 | Teot et al. | 507/129 |
| 4,739,834 A | 4/1988 | Peiffer et al. | 166/308.4 |
| 4,741,401 A | 5/1988 | Wailes et al. | 166/300 |
| 4,748,011 A | 5/1988 | Baize | 423/228 |
| 4,779,680 A | 10/1988 | Sydansk | 166/300 |
| 4,795,574 A | 1/1989 | Syrinek et al. | 507/238 |
| 4,817,717 A | 4/1989 | Jennings, Jr. et al. | 166/278 |
| 4,830,106 A | 5/1989 | Uhri | 166/250.1 |
| 4,846,277 A | 7/1989 | Khalil et al. | 166/280.1 |
| 4,848,468 A | 7/1989 | Hazlett et al. | 166/300 |
| 4,852,650 A | 8/1989 | Jennings, Jr. et al. | 166/250.1 |
| 4,869,322 A | 9/1989 | Vogt, Jr. et al. | 166/280.1 |
| 4,892,147 A | 1/1990 | Jennings, Jr. et al. | 166/280.2 |
| 4,926,940 A | 5/1990 | Stromswold | 166/247 |
| 4,938,286 A | 7/1990 | Jennings, Jr. | 166/280.1 |
| 4,978,512 A | 12/1990 | Dillon | 423/226 |
| 5,005,645 A | 4/1991 | Jennings, Jr. et al. | 166/280.1 |
| 5,024,276 A | 6/1991 | Borchardt | 166/308.6 |
| 5,067,556 A | 11/1991 | Fudono et al. | 62/196.4 |
| 5,074,359 A | 12/1991 | Schmidt | 166/280.1 |
| 5,074,991 A | 12/1991 | Weers | 208/236 |
| 5,082,579 A | 1/1992 | Dawson | 507/211 |
| 5,106,518 A | 4/1992 | Cooney et al. | 507/21 |
| 5,110,486 A | 5/1992 | Manalastas et al. | 507/260 |
| 5,169,411 A | 12/1992 | Weers | 44/421 |
| 5,224,546 A | 7/1993 | Smith et al. | 166/300 |
| 5,228,510 A | 7/1993 | Jennings, Jr. et al. | 166/263 |
| 5,246,073 A | 9/1993 | Sandiford et al. | 166/295 |
| 5,259,455 A | 11/1993 | Nimerick et al. | 166/308.5 |
| 5,330,005 A | 7/1994 | Card et al. | 166/280.2 |
| 5,342,530 A | 8/1994 | Aften et al. | 252/8.551 |
| 5,347,004 A | 9/1994 | Rivers et al. | 544/180 |
| 5,363,919 A | 11/1994 | Jennings, Jr. | 166/308.1 |
| 5,465,792 A | 1/1995 | Dawson et al. | 166/295 |
| 5,402,846 A | 4/1995 | Jennings, Jr. et al. | 166/259 |
| 5,411,091 A | 5/1995 | Jennings, Jr. | 166/280.1 |
| 5,424,284 A | 6/1995 | Patel et al. | 507/129 |
| 5,439,055 A | 8/1995 | Card et al. | 166/280.2 |
| 5,462,721 A | 10/1995 | Pounds et al. | 423/226 |
| 5,472,049 A | 12/1995 | Chaffe et al. | 166/250.1 |
| 5,482,116 A | 1/1996 | El-Rabaa et al. | 166/250.1 |
| 5,488,083 A | 1/1996 | Kinsey, III et al. | 507/211 |
| 5,497,831 A | 3/1996 | Hainey et al. | 166/308.1 |
| 5,501,275 A | 3/1996 | Card et al. | 166/280.2 |
| 5,539,044 A | 7/1996 | Dindi et al. | 524/570 |
| 5,551,516 A | 9/1996 | Norman et al. | 166/308.2 |
| 5,624,886 A | 4/1997 | Dawson et al. | 507/217 |
| 5,635,458 A | 6/1997 | Lee et al. | 507/240 |
| 5,649,596 A | 7/1997 | Jones et al. | 166/300 |
| 5,669,447 A | 9/1997 | Walker et al. | 166/300 |
| 5,674,377 A | 10/1997 | Sullivan, III et al. | 208/208 R |
| 5,688,478 A | 11/1997 | Pounds et al. | 423/228 |
| 5,693,837 A | 12/1997 | Smith et al. | 556/148 |
| 5,711,396 A | 1/1998 | Joerg et al. | 180/444 |
| 5,722,490 A | 3/1998 | Ebinger | 166/281 |
| 5,744,024 A | 4/1998 | Sullivan, III et al. | 208/236 |
| 5,755,286 A | 5/1998 | Ebinger | 166/281 |
| 5,775,425 A | 7/1998 | Weaver et al. | 166/276 |
| 5,787,986 A | 8/1998 | Weaver et al. | 166/280.2 |
| 5,806,597 A | 9/1998 | Tjon-Joe-Pin et al. | 166/300 |
| 5,807,812 A | 9/1998 | Smith et al. | 507/238 |
| 5,833,000 A | 11/1998 | Weaver et al. | 166/276 |
| 5,853,048 A | 12/1998 | Weaver et al. | 166/279 |
| 5,871,049 A | 2/1999 | Weaver et al. | 166/276 |
| 5,877,127 A | 3/1999 | Card et al. | 507/273 |
| 5,908,073 A | 6/1999 | Nguyen et al. | 166/276 |
| 5,908,814 A | 6/1999 | Patel et al. | 507/131 |
| 5,964,295 A | 10/1999 | Brown et al. | 166/308.2 |
| 5,979,557 A | 11/1999 | Card et al. | 166/300 |
| 5,980,845 A | 11/1999 | Cherry | 423/229 |
| 6,001,887 A | 12/1999 | Keup et al. | 516/118 |
| 6,016,871 A | 1/2000 | Burts, Jr. | 166/300 |
| 6,035,936 A | 3/2000 | Whalen | 166/308.5 |
| 6,047,772 A | 4/2000 | Weaver et al. | 166/276 |
| 6,054,417 A | 4/2000 | Graham et al. | 507/238 |
| 6,059,034 A | 5/2000 | Rickards et al. | 166/280.2 |
| 6,060,436 A | 5/2000 | Synder et al. | 507/266 |
| 6,063,972 A | 5/2000 | Duncum et al. | 585/15 |
| 6,069,118 A | 5/2000 | Hinkel et al. | 507/277 |
| 6,123,394 A | 9/2000 | Jeffrey | 299/16 |
| 6,133,205 A | 10/2000 | Jones | 507/276 |
| 6,147,034 A | 11/2000 | Jones et al. | 507/238 |
| 6,162,449 A | 12/2000 | Maier et al. | 424/401 |
| 6,162,766 A | 12/2000 | Muir et al. | 507/267 |
| 6,169,058 B1 | 1/2001 | Le et al. | 507/222 |
| 6,228,812 B1 | 5/2001 | Dawson et al. | 507/221 |
| 6,247,543 B1 | 6/2001 | Patel et al. | 175/64 |
| 6,267,938 B1 | 7/2001 | Warrender et al. | 423/226 |
| 6,283,212 B1 | 9/2001 | Hinkel et al. | 166/279 |
| 6,291,405 B1 | 9/2001 | Lee et al. | 507/136 |
| 6,330,916 B1 | 12/2001 | Rickards et al. | 166/280.2 |
| 6,725,931 B2 | 4/2004 | Nguyen et al. | 166/280.2 |
| 6,756,345 B2 | 6/2004 | Pakulski et al. | 507/246 |
| 6,793,018 B2 | 9/2004 | Dawson et al. | 166/300 |
| 6,832,650 B2 | 12/2004 | Nguyen et al. | 166/279 |
| 6,875,728 B2 | 4/2005 | Gupta et al. | 507/240 |
| 7,055,628 B2 | 6/2006 | Grainger et al. | 175/66 |
| 7,186,353 B2 | 3/2007 | Novak | 252/70 |
| 7,268,100 B2 | 9/2007 | Kippie et al. | 507/244 |
| 7,350,579 B2 | 4/2008 | Gatlin et al. | 166/308.3 |
| 7,392,847 B2 | 7/2008 | Gatlin et al. | 166/280.2 |
| 7,517,447 B2 | 4/2009 | Gatlin | 208/236 |
| 7,565,933 B2 | 7/2009 | Kippie et al. | |
| 7,566,686 B2 | 7/2009 | Kippie et al. | 507/213 |
| 7,712,535 B2 | 5/2010 | Venditto et al. | |
| 7,767,628 B2 | 8/2010 | Kippie et al. | 507/102 |
| 7,829,510 B2 | 11/2010 | Gatlin et al. | |
| 7,886,824 B2 | 2/2011 | Kakadjian et al. | |
| 7,915,203 B2 | 3/2011 | Falana et al. | |
| 7,932,214 B2 | 4/2011 | Zamora et al. | |
| 7,942,201 B2 | 5/2011 | Ekstrand et al. | |
| 7,956,017 B2 | 6/2011 | Gatlin et al. | |
| 7,956,217 B2 | 6/2011 | Falana et al. | |
| 7,971,659 B2 | 7/2011 | Gatlin et al. | 510/492 |
| 7,989,404 B2 | 8/2011 | Kakadjian et al. | |

(56) References Cited

U.S. PATENT DOCUMENTS

| | | |
|---|---|---|
| 7,992,653 B2 | 8/2011 | Zamora et al. |
| 8,011,431 B2 | 9/2011 | van Petegem et al. |
| 8,028,755 B2 | 10/2011 | Darnell et al. |
| 8,034,750 B2 | 10/2011 | Thompson et al. |
| 8,084,401 B2 | 12/2011 | Lukocs et al. .............. 507/238 |
| 8,093,431 B2 | 1/2012 | Falana et al. |
| 8,097,567 B2 | 1/2012 | Wilson, Jr. .................. 507/131 |
| 8,141,661 B2 | 3/2012 | Kakadjian et al. |
| 8,158,562 B2 | 4/2012 | Wilson, Jr. et al. |
| 8,172,952 B2 | 5/2012 | Wanner et al. |
| 8,220,546 B2 | 7/2012 | Kakadjian et al. |
| 8,258,339 B2 | 9/2012 | Falana et al. |
| 8,273,693 B2 | 9/2012 | Schwartz |
| 8,287,640 B2 | 10/2012 | Zamora et al. |
| 8,362,298 B2 | 1/2013 | Falana et al. |
| 8,466,094 B2 | 6/2013 | Kakadjian et al. |
| 8,475,585 B2 | 7/2013 | Zamora et al. |
| 8,507,412 B2 | 8/2013 | Lukocs et al. |
| 8,507,413 B2 | 8/2013 | Wilson, Jr. |
| 8,524,639 B2 | 9/2013 | Falana et al. |
| 8,530,394 B2 | 9/2013 | Gatlin |
| 8,563,481 B2 | 10/2013 | Gatlin et al. ................ 507/203 |
| 8,714,283 B2 | 5/2014 | Gatlin et al. |
| 8,728,989 B2 | 5/2014 | Kakadjian et al. |
| 8,772,203 B2 | 7/2014 | Schwartz |
| 8,835,364 B2 | 9/2014 | Thompson et al. |
| 8,841,240 B2 | 9/2014 | Kakadjian et al. |
| 8,846,585 B2 | 9/2014 | Falana et al. |
| 8,851,174 B2 | 10/2014 | Zamora et al. |
| 8,871,694 B2 | 10/2014 | Kakadjian et al. |
| 8,899,328 B2 | 12/2014 | Zamora et al. |
| 8,932,996 B2 | 1/2015 | Falana et al. |
| 8,944,164 B2 | 2/2015 | Veldman et al. |
| 8,946,130 B2 | 2/2015 | Zamora et al. |
| 8,950,493 B2 | 2/2015 | van Petegem et al. |
| 2002/0049256 A1 | 4/2002 | Bergeron, Jr. .............. 514/674 |
| 2002/0165308 A1 | 11/2002 | Kinniard et al. ............ 524/492 |
| 2003/0220204 A1 | 11/2003 | Baran, Jr. et al. ........... 507/200 |
| 2004/0000343 A1 | 1/2004 | Todd et al. |
| 2004/0058824 A1 | 3/2004 | Burbach et al. |
| 2005/0045330 A1 | 3/2005 | Nguyen et al. ............. 166/281 |
| 2005/0092489 A1 | 5/2005 | Welton et al. ............. 166/280.2 |
| 2008/0234147 A1 | 9/2008 | Li et al. |
| 2009/0084550 A1* | 4/2009 | Korte .................... C08L 1/02 166/294 |
| 2010/0096130 A1* | 4/2010 | Parlar ..................... C09K 8/04 166/278 |
| 2010/0252262 A1 | 10/2010 | Ekstrand et al. |
| 2010/0300759 A1 | 12/2010 | Plassade-Boupat et al. |
| 2010/0305010 A1 | 12/2010 | Falana et al. |
| 2010/0311620 A1 | 12/2010 | Kakadjian et al. |
| 2011/0001083 A1 | 1/2011 | Falana et al. |
| 2011/0177982 A1 | 7/2011 | Ekstrand et al. |
| 2011/0240131 A1 | 10/2011 | Parker |
| 2012/0071367 A1 | 3/2012 | Falana et al. |
| 2012/0073813 A1 | 3/2012 | Zamora et al. |
| 2012/0097893 A1 | 4/2012 | Wanner et al. |
| 2012/0273206 A1 | 11/2012 | Zamora et al. |
| 2012/0279727 A1 | 11/2012 | Kakadjian et al. |
| 2012/0295820 A1 | 11/2012 | Falana et al. |
| 2012/0302468 A1 | 11/2012 | Falana et al. |
| 2012/0325329 A1 | 12/2012 | Schwartz |
| 2013/0081820 A1 | 4/2013 | Falana et al. |
| 2013/0096038 A1 | 4/2013 | Kim et al. |
| 2013/0175477 A1 | 7/2013 | Falana et al. |
| 2013/0269787 A1* | 10/2013 | Choi ..................... B01J 20/264 137/2 |
| 2013/0270012 A1 | 10/2013 | Kakadjian et al. |
| 2013/0274151 A1 | 10/2013 | Kakadjian et al. |
| 2013/0312977 A1 | 11/2013 | Lembcke et al. |
| 2013/0331301 A1 | 12/2013 | Falana et al. |
| 2014/0087977 A1 | 3/2014 | Kim et al. |
| 2014/0128294 A1 | 5/2014 | Gatlin et al. |
| 2014/0128308 A1 | 5/2014 | Levey et al. |
| 2014/0166285 A1 | 6/2014 | Santra et al. |
| 2014/0262287 A1 | 9/2014 | Treybig et al. |
| 2014/0262319 A1 | 9/2014 | Treybig et al. |
| 2014/0303048 A1 | 10/2014 | Kakadjian et al. |
| 2014/0315763 A1 | 10/2014 | Kakadjian et al. |
| 2014/0318793 A1 | 10/2014 | van Petergem et al. |
| 2014/0318795 A1 | 10/2014 | Thompson, Sr. et al. |
| 2014/0323360 A1 | 10/2014 | Comarin et al. |
| 2014/0323362 A1 | 10/2014 | Falana et al. |
| 2015/0007989 A1 | 1/2015 | Tan et al. |
| 2015/0011440 A1 | 1/2015 | Zamora et al. |
| 2015/0051311 A1 | 2/2015 | Zamora et al. |
| 2015/0068747 A1 | 3/2015 | Hwang et al. |
| 2015/0072901 A1 | 3/2015 | Samuel et al. |
| 2015/0087561 A1 | 3/2015 | Falana et al. |
| 2015/0087562 A1 | 3/2015 | Falana et al. |

FOREIGN PATENT DOCUMENTS

| | | | |
|---|---|---|---|
| GB | 775376 | 10/1954 | |
| GB | 1073338 A | 6/1967 | |
| JP | 10001461 | 6/1988 | .......... C07C 211/50 |
| JP | 08151422 | 11/1996 | |
| JP | 10110115 A | 4/1998 | |
| JP | 2005194148 A | 7/2005 | |
| WO | WO 98/56497 | 12/1998 | |
| WO | 2006056774 A2 | 6/2006 | |
| WO | WO 2009141308 | 11/2009 | ............ C09K 8/528 |

* cited by examiner

HIGH WATER AND BRINE SWELL ELASTOMERIC COMPOSITIONS AND METHOD FOR MAKING AND USING SAME

RELATED APPLICATIONS

This application claims priority to and the benefit of U.S. Provisional Patent Application Ser. No. 61/705,549 filed Sep. 25, 2012 (25 Sep. 2012).

BACKGROUND OF THE INVENTION

1. Field of the Invention

Embodiments of the present invention relate to swellable compositions and methods for making and using same.

More particularly, embodiments of the present invention relate to swellable compositions including at least one curable elastomer, a least one cure system, at least one high molecular weight (HMW) swelling agent and at least one low molecular weight (LMW) swelling agent and to methods for making and using same.

2. Description of the Related Art

In oilfield applications, swellable packers are used as isolation devices that rely on swellable elastomers that expand in contact with certain well fluids to form annular seals. The swellable elastomers used in these packers are oil and/or aqueous swellable elastomers.

A swellable elastomer is a rubber that increases in volume by absorbing a fluid, typically the fluid is a well bore fluid present during the installation of the swellable packer or is a produced fluid present when the well is brought online. Some swellable rubbers swell in aqueous fluids, while others swell in oil based fluids. Swellable elastomers are known that are capable of swelling in aqueous fluid, oils, or mixture thereof, so called hybrid swellable elastomers.

Almost 100 years of rubber engineering has been committed to the prevention of or minimization of rubber swelling, because elements such as O-rings, seals and other rubber elements were designed not to change shape and dimension in order to retain their sealing properties. Only recently has the swelling of elastomers been recognized as a potential advantage in downhole applications in the energy industry, while patents and applications exist for swellable materials using in sealing water pipes dating back decades. Swellable elastomeric systems employ this natural and passive process of elastomer swelling in the presence of hydrocarbon well fluids or aqueous well fluids to isolate discrete reservoir intervals in oil wells, gas wells, and injection wells.

In the previous discoveries, metal-containing organic compound were used to crosslink elastomer molecular chains or graft onto elastomer molecules by ionic bond in normal curing condition for the purpose of enhancing the aqueous swell capability of superabsorbent polymer (SAP)-containing swellable elastomers for oilfield downhole application. Metal ionic cross-linkage network increases not only crosslinking density but also ionic density (or chemical potential) of swellable elastomers. Therefore, osmotic pressure between such swellalbe elastomers and water/brine is increased to absorb water faster and more.

While many swellable elastomeric compositions have been produced and used in downhole applications, many suffer from inconsistent non-uniform, and/or differential swelling and/or inconsistent, non-uniform, and/or differential swelling rates. Thus, there is a need in the art for new swellable elastomeric compositions that do not suffer from one, some or all of these deficiencies.

SUMMARY OF THE INVENTION

Embodiments of this invention provide swellable compositions including at least one curable elastomer, a least one cure system, at least one high molecular weight (HMW) swelling agent and at least one low molecular weight (LMW) swelling agent.

Embodiments of this invention provide swellable systems including an elastomeric subsystem including at least one curable elastomer, a cure subsystem including a least one curing agent, a swelling subsystem including at least one high molecular swelling agent and at least one low molecular weight swelling agent.

Embodiments of this invention provide methods for preparing a swellable composition or system including mixing at least one curable elastomer, at least one high molecular swelling agent, at least one low molecular weight swelling agent and a cure system, where the cure system is present in an amount sufficient to cure the at least one curable elastomer to a desired cure level or state of cure.

Embodiments of this invention provide swellable components or constructs for use in downhole applications, where the components or constructs are made from a swellable system including an elastomeric subsystem including at least one curable elastomer, a cure subsystem including a least one curing agent, a swelling subsystem including at least one high molecular swelling agent and at least one low molecular weight swelling agent.

An oilfield apparatus comprising a swellable composition including at least one curable elastomer, a least one cure system, at least one high molecular weight (HMW) swelling agent and at least one low molecular weight (LMW) swelling agent. Due to the structures of the polymeric networks of the compositions of this invention, the compositions show improved rate of swelling in water, brines and aqueous solutions, swellability, and/or physical properties of the compositions.

An oilfield assembly for exploring for, drilling for, testing for, or producing hydrocarbons comprising: (a) one or more oilfield apparatus selected from the group consisting of tubing, jointed pipe, sucker rods, electric submersible pumps, submersible pump motor protector bags, packers, packer elements, blow out preventers, blow out preventer elements, self-healing cements, proppants, O-rings, T-rings, centralizers, hangers, plugs, plug catchers, check valves, universal valves, spotting valves, differential valves, circulation valves, equalizing valves, safety valves, fluid flow control valves, sliding seals, connectors, disconnect tools, downhole filters, motor heads, retrieval and fishing tools, bottom hole assemblies, seal assemblies, snap latch assemblies, anchor latch assemblies, shear-type anchor latch assemblies, no-go locators, sensor protectors, gaskets, pump shaft seals, tube seals, valve seals, seals and insulators used in electrical components, seals used in fiber optic connections, pressure sealing elements for fluids, and combinations thereof; and (b) one or more of the oilfield apparatus comprising a swellable composition including at least one curable elastomer, a least one cure system, at least one high molecular weight (HMW) swelling agent and at least one low molecular weight (LMW) swelling agent.

A method comprising (a) selecting one or more oilfield apparatus having a component comprising a swellable composition including at least one curable elastomer, a least one cure system, at least one high molecular weight (HMW)

swelling agent and at least one low molecular weight (LMW) swelling agent; and (b) using the one or more oilfield apparatus in an oilfield operation, thus exposing the oilfield apparatus to an oilfield environment. In certain embodiments, the oilfield apparatus is selected from the group consisting of submersible pump motor protector bags, packer elements, blow out preventer elements, self-healing cements, proppants, O-rings, T-rings, centralizers, hangers, plugs, plug catchers, check valves, universal valves, spotting valves, differential valves, circulation valves, equalizing valves, safety valves, fluid flow control valves, sliding seals, connectors, disconnect tools, downhole filters, motor heads, retrieval and fishing tools, bottom hole assemblies, seal assemblies, snap latch assemblies, anchor latch assemblies, shear-type anchor latch assemblies, no-go locators, sensor protectors, gaskets, pump shaft seals, tube seals, valve seals, seals and insulators used in electrical components, seals used in fiber optic connections, pressure sealing elements for fluids, and combinations thereof.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1A:
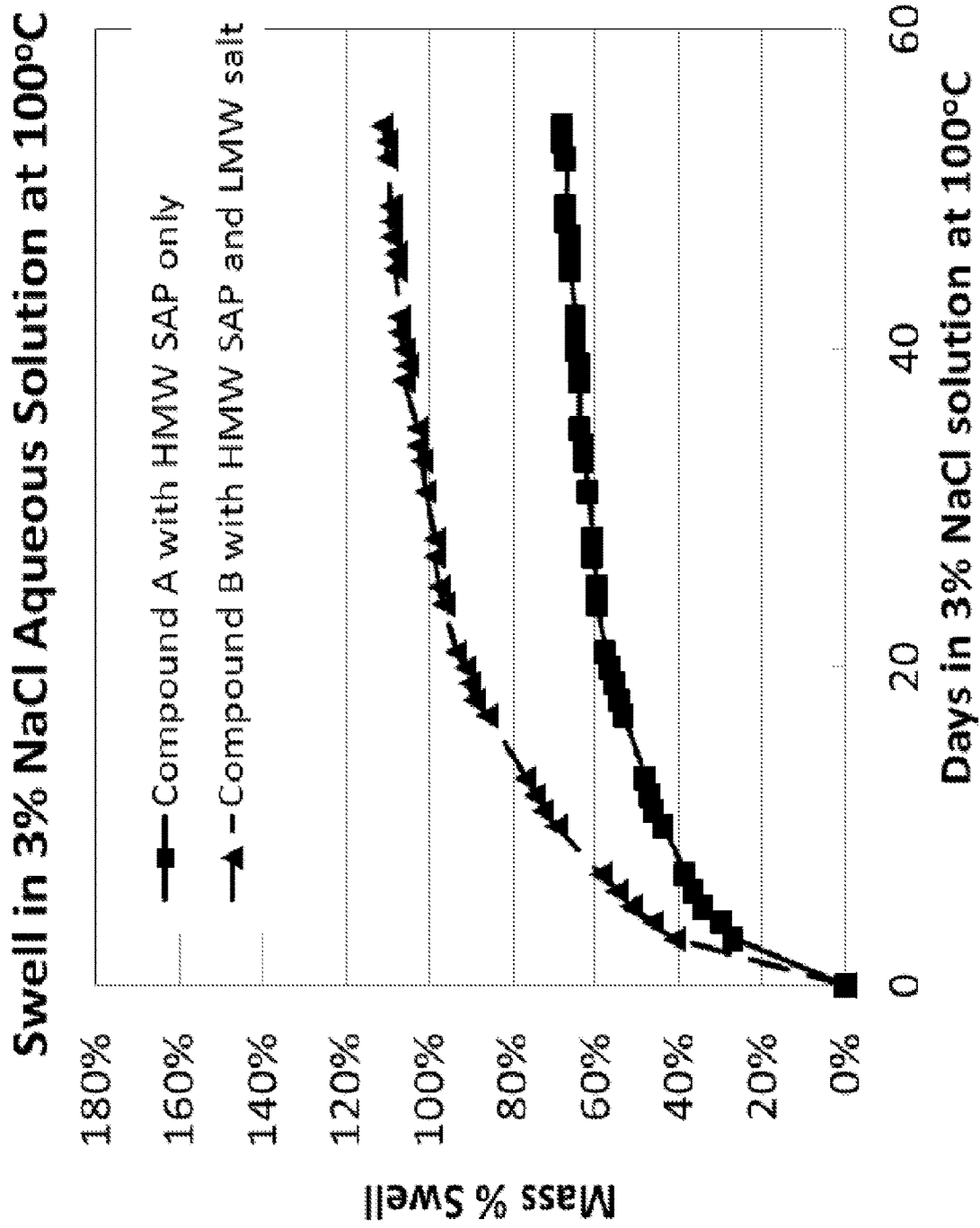
FIG. 1A depicts swelling data for Comparative Example 1 and Example 1 in a 3 wt. % NaCl brine.

The inventors have found that swellable elastomeric compositions may be formulated that enhance water and/or brine swell capabilities. The formulations show increased volume and weight gains in contact with water, brines, or other aqueous fluids. The inventors have found that water swelling elastomeric systems include an elastomer subsystem, a cure subsystem, and a swelling agent subsystem. The swelling agent subsystem includes one high molecular weight (HMW) superabsorbent polymer (SAP) or a plurality of HMW SAPs or at least one HMW SAP and one low molecular weight (LMW) salt or a plurality of LMW salts or at least one LMW salt. These systems may be tailored to have desired swelling properties in aqueous media. The inventors have also found that the compositions of this invention may include a primary cure system and secondary cure system, where the primary cure system forms covalent crosslinks, while the secondary cure system forms ionic crosslinks. For additional information on ionic crosslinking of swellable elastomeric composition, the reader is directed to U.S. Provisional Application Ser. No. 61/544,207 filed 6 Oct. 2011 and U.S. patent application Ser. No. 13/645,460, filed 6 Oct. 2012.

Low Molecular Weight (LMW) Salts

In many applications, LMW salts are not practical solutions for formulating aqueous swellable elastomeric compositions for use in water swellable packer applications, because LMW salts tend to quickly leaching out of the compositions when the compositions are placed in contact with water, brines, or other aqueous fluids. Thus, the compositions are not able to retain the LMW salts for a reasonable period of time, and are, therefore, generally ill suited for use in permanent swellable packer applications. As the LMW salts are leached out of the swellable elastomeric system, the swollen system tends to shrink back to its original volume. Additionally, as the LMW salts flows out of elastomeric system as a brine, the systems lose their initially load of LMW salts.

High Molecular Weight (HMW) Superabsorbent Polymers (SAPs)

In contrast to LMW salts, which are solvated by water to increase system volume, HMW SAPs comprise lightly crosslinked polymers that are capable of absorbing between about 200 and about 500 times their weight of water. The swollen HMW SAPs generally remain in the systems, because the HMW SAPs are high molecular weight and are crosslinked. Thus, most water swellable packers are formed using only HMW SAPs.

Swelling Mechanism in Water, Brines, or Other Aqueous Fluids

The swelling mechanism of swellable compositions in water, brines, or other aqueous fluids is illustrated with the well-known HMW superabsorbent polymers (SAPs) that blended in elastomers. For example, poly(acryl amide-co-acrylic acid) potassium salt or sodium polyacrylate is a polyelectrolyte and swells due to osmotic pressure effects. The anionic charge on the pendent groups of the polymer chain needs to be balanced by cationic counter ions ($Na^+$ or $K^+$). Thus, the counter ions ($Na^+$ or $K^+$) will not diffuse out of the polymer matrix unlike LMW salts. As a consequence, the chemical potentials of the counter ions in the elastomeric matrix are higher than that of the counter ions in the water outside the elastomeric matrix. To equalize the chemical potentials of the counter ions (or to maintain thermodynamic equilibrium), water migrates into the polymeric or elastomeric matrix, leading to swelling of the matrix. The extent of swelling of the polymeric or elastomeric matrix is derived from the balance between the stretch-ability of the polymer network and the osmotic pressure effects of the counter ions.

Problems of Current Method

If a water swellable elastomeric system is placed in a brine rather than pure water, the swell capability of the system is drastically reduced, because the counter ions in brine have higher chemical potentials than in pure water and the difference between the chemical potentials of the counter ions in the matrix and the brine are similar. As a consequence, the osmotic pressure due to the difference between the chemical potentials of the counter ions in a HMW SAP and the chemical potentials of the counter ions in the brine is lower than the difference between the chemical potentials of the counter ions in a HMW SAP and the chemical potentials of the counter ions in pure water.

Certain conventional swellable elastomeric systems having practical levels of swellability in water, brines, or other aqueous solutions are designed intentionally with elastomer having a low state of cure and/or a large loading of HMW SAPs. However, the low state of cure and high loading of HMW SAPs in the elastomeric system lead to poor physical and mechanical properties of the swellable elastomeric system. In general, large loadings of HMW SAPs to an elastomeric matrix is not effective unless the degree of cure is reduced. Swellable packers, which are made of a loosely cured elastomeric matrix, are unable to withstand a high differential pressures encountered in harsh downhole environments.

New Swellable Elastomeric Compositions, Systems, and Constructs

Embodiments of this invention relate to new methods to prepare to swellable elastomeric compositions, swellable elastomeric systems, and swellable elastomeric containing constructs, where the methods are designed to increase chemical potentials of the counter ions in HMW SAP-containing swellable elastomeric matrices efficiently and effectively. The new methods for preparing swellable elastomeric compositions, systems, and constructs therefrom achieve these improvements by changing a level of cross-linking of the elastomers, while increasing water/brine swell capabilities substantially even in a highly concentrated saline solution or brine. The methods are based on mixing at least one HMW SAP (sometimes referred to as a hydrogel) and LMW salts into an elastomeric matrix including at least one curable elastomer to form a swellable elastomeric composition swellable in water, brines, or other aqueous fluids. Using a mixture of high molecular swelling agents such as HMW SAPs and low molecular weight swelling agents such as LMW salts allows the compositions to achieve the following chemical mechanisms simultaneously, substantially simultaneously, or sequentially. (1) Water starts migrating into the swellable elastomeric systems by osmotic pressure. The absorption rate should be fast due to higher chemical potentials of counter ions in the systems due to addition of LMW salt as well as HMW SAPs. Higher differences of the chemical potentials inside the swellable elastomeric systems compared to outside swellable elastomeric systems are increased due to the added LMW salts generating a higher osmotic pressure. (2) The migrating water starts dissolving the LMW salts in the elastomeric systems forming a brine solution within the elastomeric matrix or network. (3) The HMW SAPs take up the water from the brine solution produced by the water migrating into and combining with the LMW salts in the elastomeric matrix or network prior to the brine solution becoming concentrated. (4) The swollen HMW SAPs stay in the elastomeric matrix or network due to the restricted mobility of water containing-macromolecules. (5) LMW salt continues to attract water outside elastomer and forward it to HMW SAP before it becomes concentrated. As a consequence, brine solution concentration of the elastomeric system remains low enough for the HMW SAPs to continue to absorb water from the solution in the matrix until HMW SAPs are fully saturated. (6) Overall chemical potential of the swellable elastomeric systems remains higher with addition of the LMW salts than without addition of LMW salts.

Suitable Reagents

Suitable high molecular weight swelling agents include, without limitation, high molecular weight hydrogels, high molecular weigh superabsorbent polymers (HMW SAPs), high molecular weight ionomers, or mixtures and combinations thereof. Exemplary examples of HMW SAPs include, without limitations, sodium polyacrylates, potassium polyacrylates, sodium polymethacrylates, potassium polymethacrylates, poly(acryl amide-co-acrylic acid) sodium salt, poly(acryl amide-co-acrylic acid) potassium salt, poly(acryl amide-co-acrylic acid) sodium salt and potassium salt, 2-acrylamido-2-methylpropane sulfonic acid (AMPS), or mixtures and combinations thereof.

Suitable low molecular weight (LMW) swell agents include, without limitation, LMW salts, LMW polysalts, or mixtures and combinations thereof. Exemplary LMW salts include, without limitation, halides, hydroxides, carbonates, formates, acetates, phosphates, triphosphates, polyphosphates, sulfates, perchlorates, citrates, oxylates, or mixtures and combinnations thereof. Exemplary counter ions include, without limitation, alkali metals, alkaline earth metals, other monovalent and divalent metals, ammonium, phosphonium, or mixtures and combinations thereof. Exemplary halides include, without limitation, fluoride, chlorides, bromides, or mixtures and combinations thereof, where the counterions are sodium, potassium, calcium or mixtures and combinations thereof. Exemplary acetates include, without limitation, sodium acetate, potassium acetate, calcium acetate, or mixtures and combinations thereof. Exemplary formates include, without limitation, sodium formate, potassium formate, calcium formate, or mixtures and combinations thereof. Exemplary trisphosphates include, without limitation, ammonium triphosphate, sodium triphosphate, potassium triphosphate, calcium triphosphate, or mixtures and combinations thereof. Exemplary perchlorates include, without limitation, ammonium perchlorate, sodium perchlorate, potassium perchlorate, or mixtures and combinations thereof. Exemplary polyphosphates include, without limitation, ammonium polyphosphate, sodium polyphosphate, potassium polyphosphate, or mixtures and combinations thereof. Exemplary acrylates include, without limitation, ammonium sodium acrylate, potassium acrylate, or mixtures and combinations thereof. Exemplary carbonates include, without limitation, sodium carbonate, potassium carbonate, or mixtures and combinations thereof. Exemplary hydroxides include, without limitation, ammonium hydroxide, sodium hydroxide, potassium hydroxide, or mixtures and combinations thereof.

Suitable curable elastomers include, without limitation, nitrile-butadiene rubber (NBR), hydrogenated NBR, hydrogenated nitrile rubber (HNBR), chemically functionalized NBR (Carboxylated NBR), ethylene-propylene-diene-copolymer (EPDM), ethylene-propylene ruber (EPR), fluorinated elastomers (FKM, FFKM, FEPM), styrene-butadiene rubber (SBR), hydrogenated styrene-butadiene rubber (hSBR), isoprene-butadiene rubber (IBR), hydrogenated isoprene-butadiene rubber (hIBR), styrene-isoprene rubber (SIR), hydrogenated styrene-isoprene rubber (hSIR), styrene-butadiene-isoprene (SIBR), hydrogenated styrene-butadiene-isoprene rubber (hSIBR), block, triblock and multi-block polymers of styrene-isoprene, styrene-butadiene, styrene-butadiene-isoprene thermoplastic elastomers, hydrogenated block, triblock and multi-block polymers of styrene-isoprene, styrene-butadiene, styrene-butadiene-isoprene thermoplastic elastomers, silicone rubbers, or mixtures and combinations thereof.

Suitable cure systems include, without limitation, sulfur based cure systems, peroxide based cure systems, radiation based cure systems, or mixtures and combinations thereof. Exemplary crosslinking system include, without limitation, peroxides, sulfur, sulfur-donors, amines, phenolic resins, metal oxides, irradiation source, any other crosslinking system that can generate free radicals, ions, or any other reactive sites on the molecular chain of elastomers, or mixtures and combinations thereof.

Suitable additives for use in the compositions of this invention include fillers and reinforcing fillers such as carbon black, silica, clay, etc., co-cure-agents, process aids, antioxidants, antiozonants, flame retardants, etc. or mixtures or combinations thereof.

Oilfield Elements and Assemblies

An "oilfield assembly", as used herein, is the complete set or suite of oilfield elements that may be used in a particular job. All oilfield elements in an oilfield assembly may or may not be interconnected, and some may be interchangeable.

An "oilfield element" includes, but is not limited to one or more items or assemblies selected from zonal isolation tool elastomeric elements, packer elements, blow out preventer elements, self-healing cements, proppants, O-rings, T-rings, electric submersible pump protectors, centralizers, hangers, plugs, plug catchers, check valves, universal valves, spotting valves, differential valves, circulation valves, equalizing valves, safety valves, fluid flow control valves, connectors, disconnect tools, downhole filters, motor heads, retrieval and fishing tools, bottom hole assemblies, seal assemblies, snap latch assemblies, anchor latch assemblies, shear-type anchor latch assemblies, no-go locators, and the like.

A "packer" is a device that can be run into a wellbore with a smaller initial outside diameter that then expands externally to seal the wellbore. Packers employ flexible, elastomeric seal elements that expand. The two most common forms are the production or test packer and the inflatable packer. The expansion of the former may be accomplished by squeezing the elastomeric elements (somewhat doughnut shaped) between two plates or between two conical frusta pointed inward, forcing the elastomeric elements' sides to bulge outward. The expansion of the latter may be accomplished by pumping a fluid into a bladder, in much the same fashion as a balloon, but having more robust construction. Production or test packers maybe set in cased holes and inflatable packers may be used in open or cased holes. They may be run down into the well on wireline, pipe or coiled tubing. Some packers are designed to be removable, while others are permanent. Permanent packers are constructed of materials that are easy to drill or mill out. A packer may be used during completion to isolate the annulus from the production conduit, enabling controlled production, injection or treatment. A typical packer assembly incorporates a means of securing the packer against the casing or liner wall, such as a slip arrangement, and a means of creating a reliable hydraulic seal to isolate the annulus, typically by means of an expandable elastomeric element. Packers are classified by application, setting method and possible retrievability. Inflatable packers are capable of relatively large expansion ratios, an important factor in through-tubing work where the tubing size or completion components can impose a significant size restriction on devices designed to set in the casing or liner below the tubing. Seal elements may either be bonded-type or chevron-type, and may employ seal elements comprising one or more elastomeric compositions described herein, and these elastomeric compositions may comprise one or more thermoplastic polymers, such as the polytetrafluoroethylene known under the trade designation TEFLON, available from E.I. DuPont de Nemours & Company; the polyphenylene sulfide thermoplastics known under the trade designation RYTON and polyphenylene sulfide-based alloys known under the trade designation XTEL both available from Chevron Phillips Chemical Company LP. Both bond-type and chevron-type seal elements are available from Schlumberger.

Compositional Ranges for Two Swelling Agents

Embodiments of the systems of this invention includes:
from about 10 parts per hundred of rubber (phr) to about 150 phr of at least one HMW SAP, and
from about 3 phr to about 70 phr of at least one LMW salt.
In other embodiments, the systems includes:
from about 50 phr to about 120 phr of at least one HMW SAP and
from about 5 phr to about 30phr of at least one LMW salt.
Embodiments of the compositions of this invention comprises:
100 phr of one elastomer or a mixture of elastomers,
about 1 phr to about 30 phr of a conventional cure system,
about 1 phr to about 50 phr of a co-cure system,
from about 10 parts per hundred of rubber (phr) to about 150 phr of at least one HMW SAP,
from about 3 phr to about 70 phr of at least one LMW salt, and
from 0 phr to about 100 phr of fillers or other materials.
Embodiments of the compositions of this invention comprises:
100 phr of one elastomer or a mixture of elastomers,
about 1 phr to about 20 phr of a conventional cure system,
about 1 phr to about 40 phr of a co-cure system,
from about 10 parts per hundred of rubber (phr) to about 150 phr of at least one HMW SAP,
from about 3 phr to about 70 phr of at least one LMW salt, and
about 0 phr to about 100 phr of fillers or other materials.
Embodiments of the compositions of this invention comprises:
100 phr of one elastomer or a mixture of elastomers,
about 1 phr to about 15 phr of a conventional cure system,
about 1 phr to about 30 phr of a co-cure system,
from about 50 phr to about 120 phr of at least one HMW SAP and
from about 5 phr to about 30phr of at least one LMW salt, and
from 0 phr to about 100 phr of fillers or other materials.
Embodiments of the compositions of this invention comprises:
100 phr of one elastomer or a mixture of elastomers,
about 1 phr to about 15 phr of a conventional cure system,
about 1 phr to about 20 phr of a co-cure system,
from about 50 phr to about 120 phr of at least one HMW SAP and
from about 5 phr to about 30phr of at least one LMW salt, and
from 0 phr to about 100 phr of fillers or other materials.

EXPERIMENTAL SECTION OF THE INVENTION

Comparative Example 1 and Example 1

This example illustrates the preparation and testing of a Comparative Example 1 and Example 1 and their test results. Table I tabulates the ingredients used to prepare Comparative Example 1 and Example 1.

TABLE I

Compositions of Comparative Example 1 and Example 1

| Component | Ingredient | Comparative Example 1 | Example 1 |
|---|---|---|---|
| Elastomer | EPDM | 100 phr | 100 phr |
| Cure System | Weatherford Proprietary* | Proprietary | Proprietary |
| Additives | Weatherford Proprietary* | Proprietary | Proprietary |
| HMW SAP | Poly(acrylamide-co-acrylic acid) Potassium | 80 phr | 80 phr |
| LMW Salt | Sodium Formate | 0 phr | 10 phr |

*the cure system and additives are available from Weatherford International of Houston, Texas Referring now to FIG. 1A, the swellable Example 1 versus Comparative Example 1 in a 3 wt. % sodium chloride (NaCl) brine. The data show that the composition of Example 1 including 80 phr of a high molecular weight swelling agent and 10 phr of a low molecular weight swelling agent had about a 75% increase in swelling after 50 days.

Figure 1B:
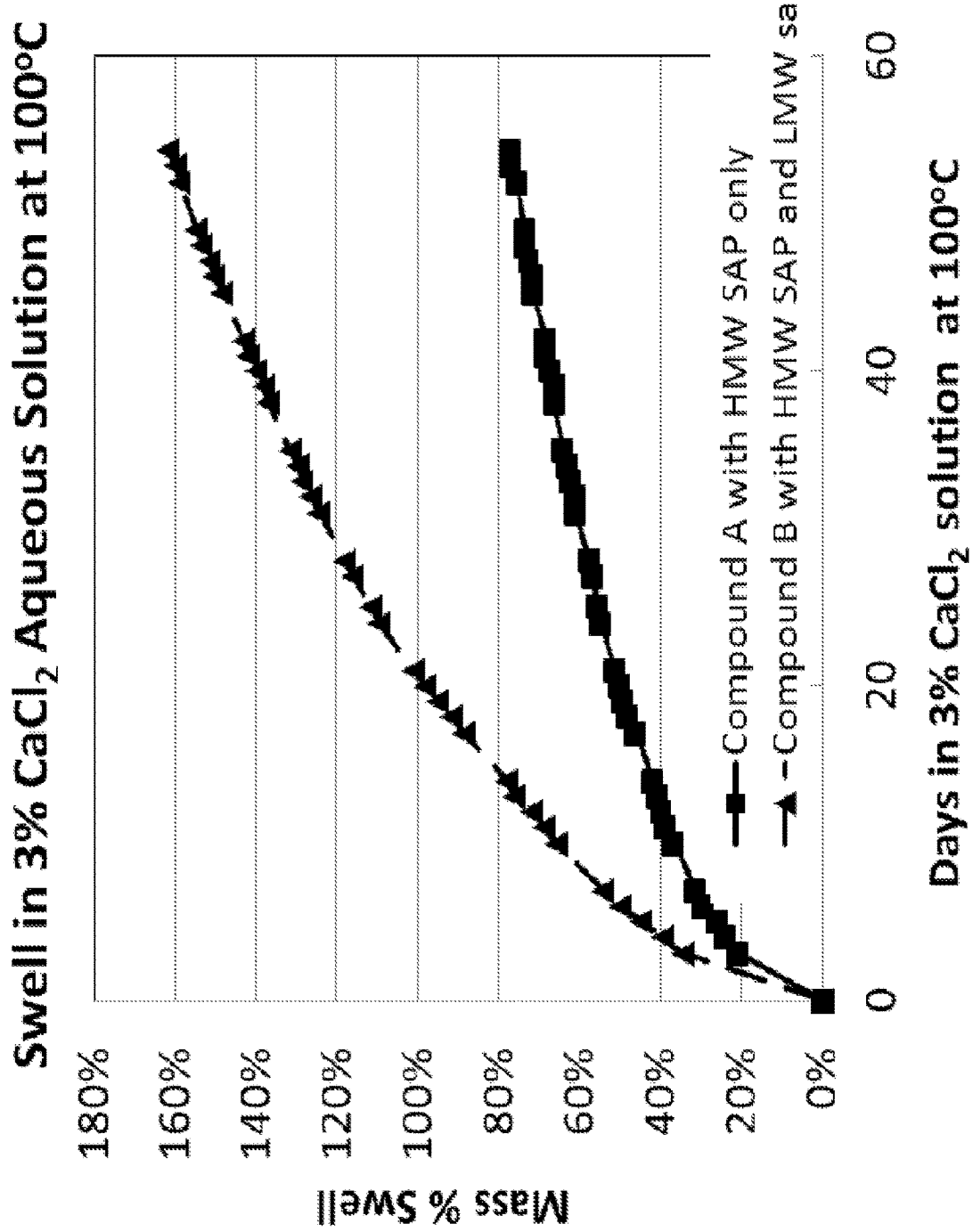
FIG. 1B depicts swelling data for Comparative Example 1 and Example 1 in a 3 wt. % CaCl$_2$ brine.

Referring now to FIG. 1B, the swellable Example 1 versus Comparative Example 1 in a 3 wt. % calcium chloride ($CaCl_2$) brine. The data show that the composition of Example 1 including 80 phr of a high molecular weight swelling agent and 10 phr of a low molecular weight swelling agent had about a 105% increase in swelling after 50 days.

Comparative Example 2, Example 2A and Example 2B

This example illustrates the preparation and testing of a Comparative Example 2 and Example 2 and their test results. Table II tabulates the ingredients used to prepare Comparative Example 2, Example 2a and Example 2b.

TABLE II

Compositions of Comparative Example 2, Example 2a and Example 2b

| Component | Ingredient | Comparative Example 2 | Example 2a | Example 2b |
|---|---|---|---|---|
| Elastomer | EPDM | 100 phr | 100 phr | 100 phr |
| Cure System | Weatherford Proprietary* | Proprietary | Proprietary | |
| Additives | Weatherford Proprietary* | Proprietary | Proprietary | |
| HMW SAP | Poly(acrylamide-co-acrylic acid) Potassium | 80 phr | 80 phr | 80 phr |
| LMW Salt | Sodium Formate | 0 phr | 10 phr | 15 phr |

Figure 2A:
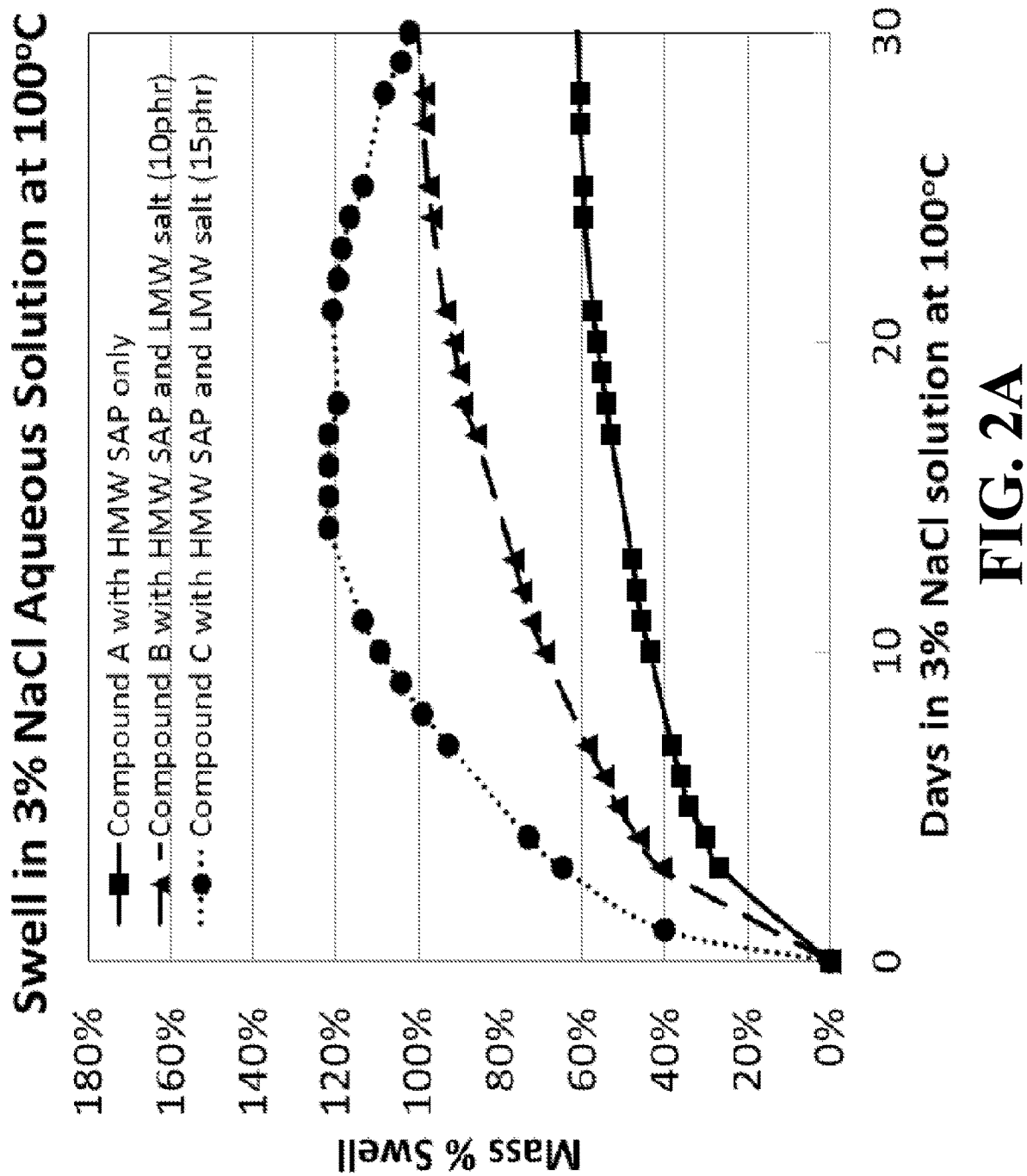
FIG. 2A depicts swelling data for Comparative Example 2 and Example 2 in a 3 wt. % NaCl brine.

*the cure system and additives are available from Weatherford International of Houston, Texas Referring now to FIG. 2A, the swellable Example 2a and Examples 2b versus Comparative Example 2a in a 3 wt. % sodium chloride (NaCl) brine. The data show that the composition of Example 2a including 80 phr of a high molecular weight swelling agent and 10 phr of a low molecular weight swelling agent had about a 67% increase in swelling after 50 days, while the composition of Example 2b including 80 phr of a high molecular weight swelling agent and 15 phr of a low molecular weight swelling agent had about a 100% increase in swelling at its maximum, but decreased from to an increase of about 67% after 50 days.

Figure 2B:
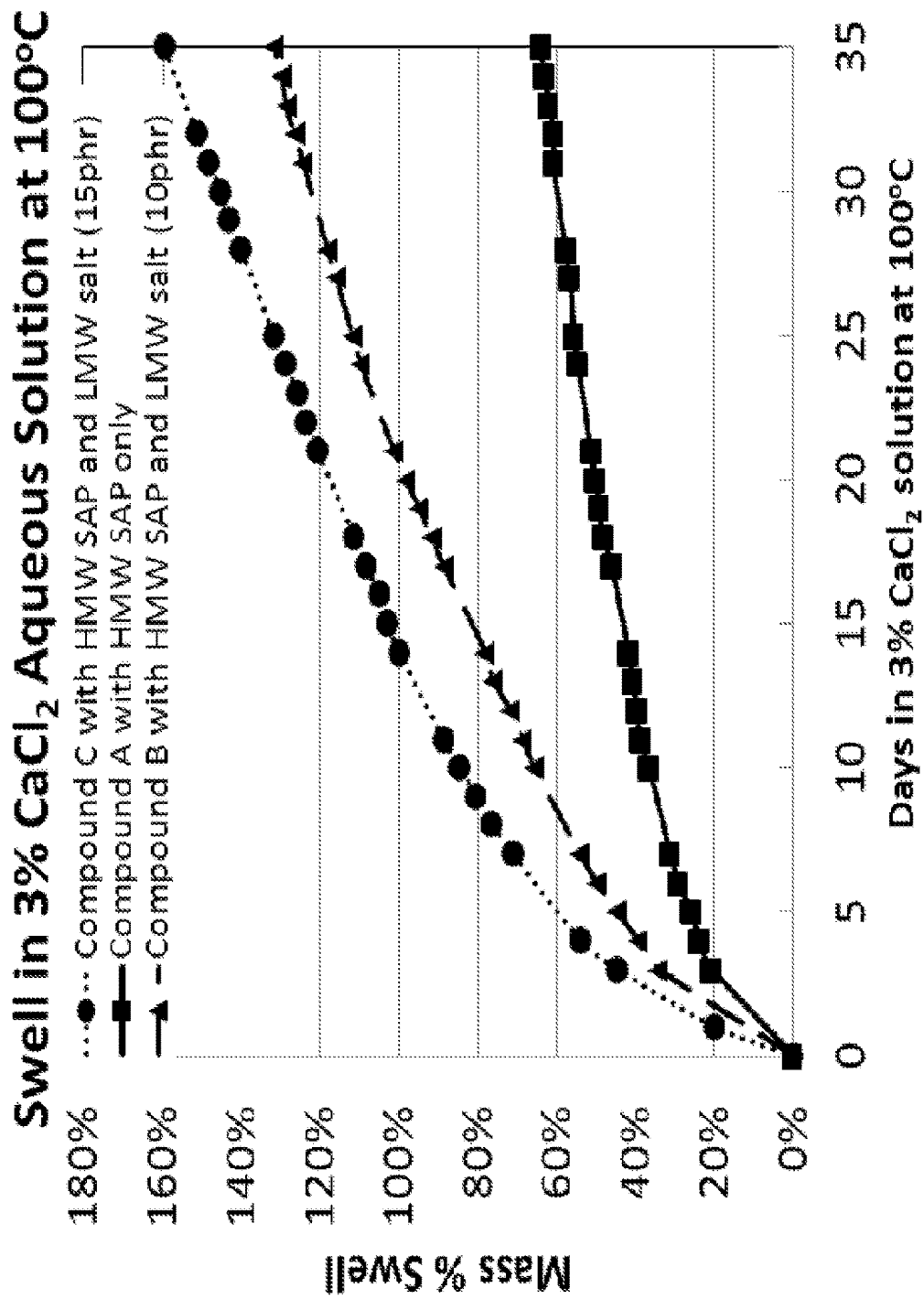
FIG. 2B depicts swelling data for Comparative Example 2 and Example 2 in a 3 wt. % CaCl$_2$ brine.

Referring now to FIG. 2B, the swellable Example 2a and Examples 2b versus Comparative Example 2b in a 3 wt. % calcium chloride ($CaCl_2$) brine. The data show that the composition of Example 2a including 80 phr of a high molecular weight swelling agent and 10 phr of a low molecular weight swelling agent had about a 110% increase in swelling after 35 days, while the composition of Example 2b including 80 phr of a high molecular weight swelling agent and 15 phr of a low molecular weight swelling agent had about a 160% after 35 days.

Figure 2C:
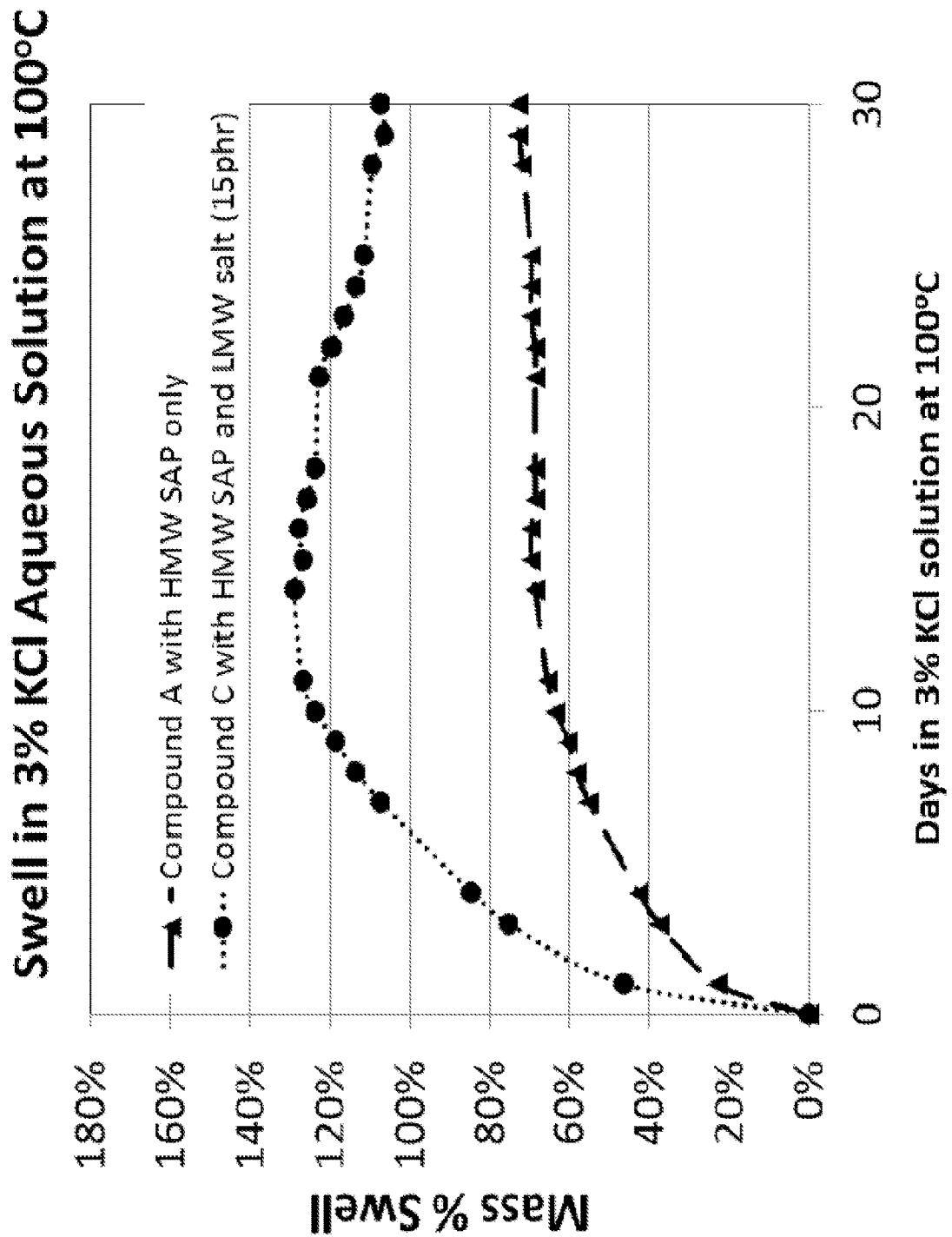
FIG. 2C depicts swelling data for Comparative Example 2 and Example 2 in a 3 wt. % KCl brine.

Referring now to FIG. 2C, the swellable Example 2 versus Comparative Example 2b in a 3 wt. % potassium chloride (KCl) brine. The data show that the composition of Example 2b including 80 phr of a high molecular weight swelling agent and 15 phr of a low molecular weight swelling agent had about a 86% increase in swelling at its maximum, but decreased from to an increase of about 57% after 30 days, where it appears to stabilize.

Comparative Example 3, Example 3A and Example 3B

This example illustrates the preparation and testing of a Comparative Example 3 and Example 3 and their test results. Table III tabulates the ingredients used to prepare Comparative Example 3, Example 3a and Example 3b.

TABLE III

Compositions of Comparative Example 3, Example 3a and Example 3b Example 3

| Component | Ingredient | Comparative Example 3 | Example 3a | Example 3b |
|---|---|---|---|---|
| Elastomer | EPDM | 100 phr | 100 phr | 100 phr |
| Cure System | Weatherford Proprietary* | | Proprietary | |
| Additives | Weatherford Proprietary* | | Proprietary | |
| HMW SAP | Poly(acrylamide-co-acrylic acid) Potassium | 80 phr | 80 phr | 80 phr |
| LMW Salt | Sodium Formate | 0 phr | 15 phr | 0 phr |
| LMW Salt | Potassium Acetate | 0 phr | 0 phr | 15 phr |

Figure 3A:
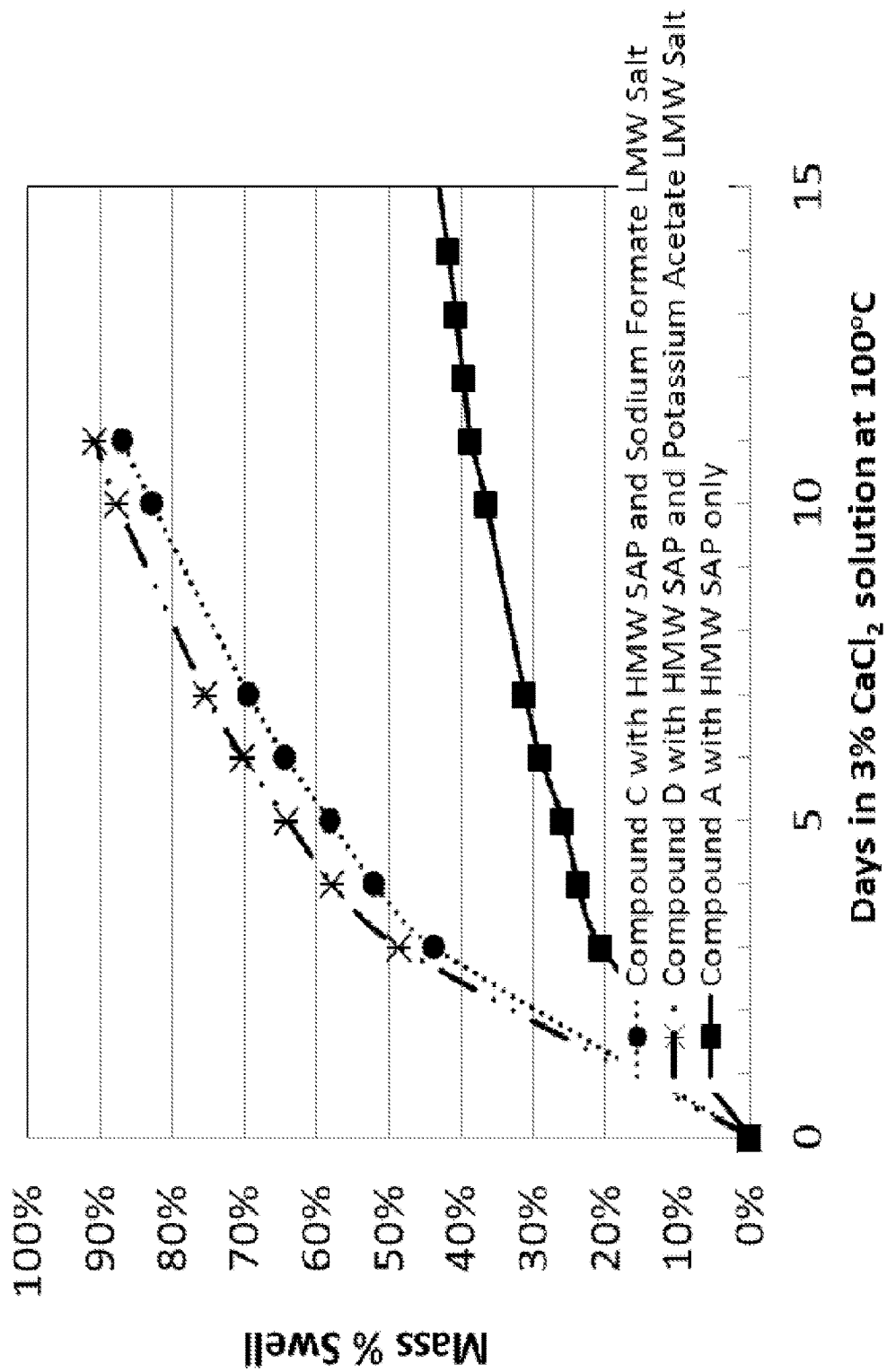
FIG. 3A depicts swelling data for Comparative Example 3 and Example 3 in a 3 wt. % CaCl$_2$ brine.

*the cure system and additives are available from Weatherford International of Houston, Texas Referring now to FIG. 3A, the swellable Example 3a and Examples 3b versus Comparative Example 3a in a 3 wt. % calcium chloride ($CaCl_2$) brine. The data show that the composition of Example 3a including 80 phr of a high molecular weight swelling agent and 15 phr of a first low molecular weight swelling agent had about a 100% increase in swelling after 15 days, while the composition of Example 3b including 80 phr of a high molecular weight swelling agent and 15 phr of a second low molecular weight swelling agent also had about a 100% increase in swelling after 15 days.

Figure 3B:
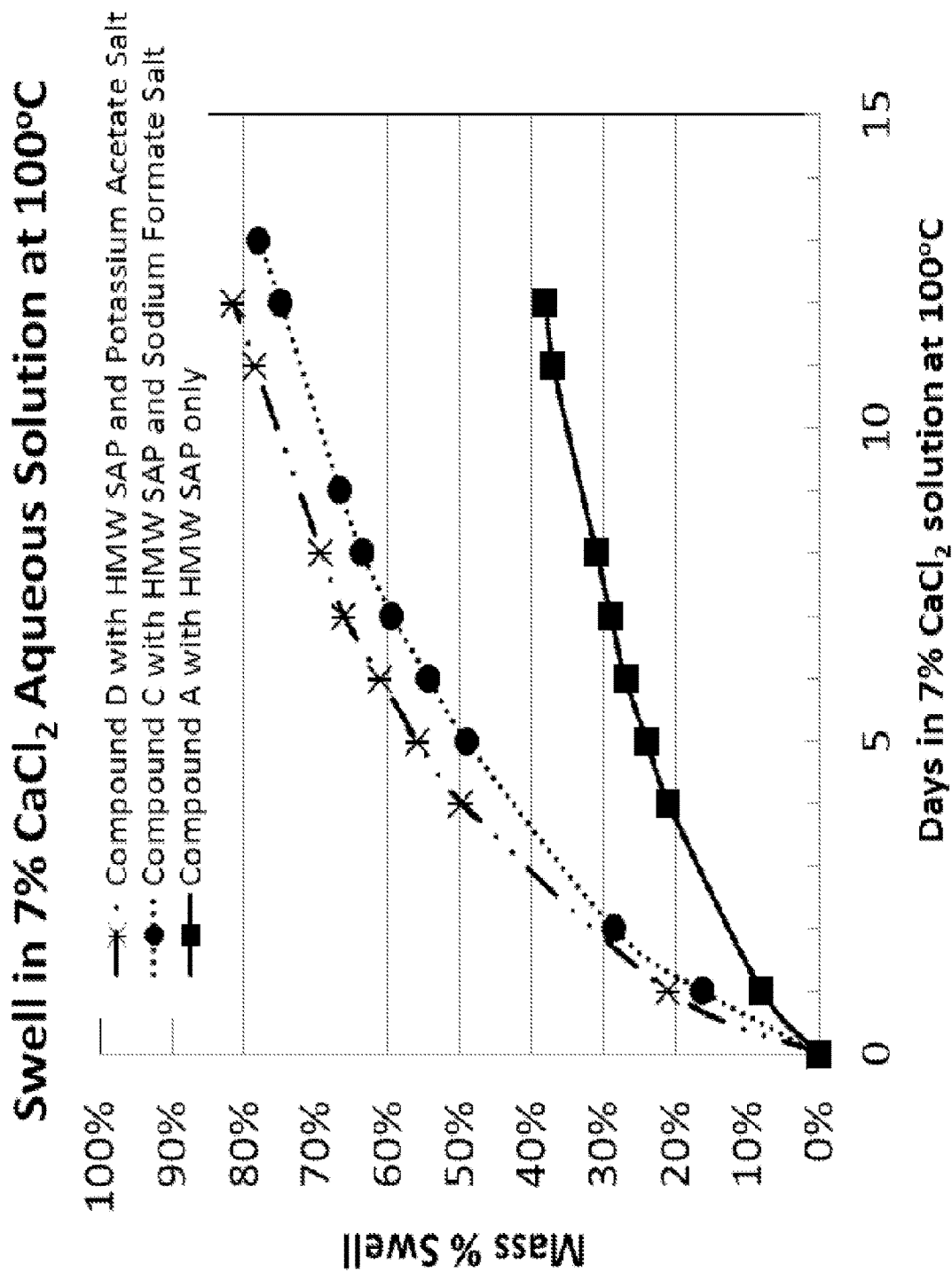
FIG. 3B depicts swelling data for Comparative Example 3 and Example 3 in a 7 wt. % CaCl$_2$ brine.

Referring now to FIG. 3B, the swellable Example 3a and Examples 3b versus Comparative Example 3b in a 7 wt. % calcium chloride ($CaCl_2$) brine. The data show that the composition of Example 3a including 80 phr of a high molecular weight swelling agent and 15 phr of the first low molecular weight swelling agent had about a 100% increase in swelling after 12 days, while the composition of Example 3b including 80 phr of a high molecular weight swelling agent and 15 phr of the second low molecular weight swelling agent had about a 100% after 13 days.

Figure 3C:
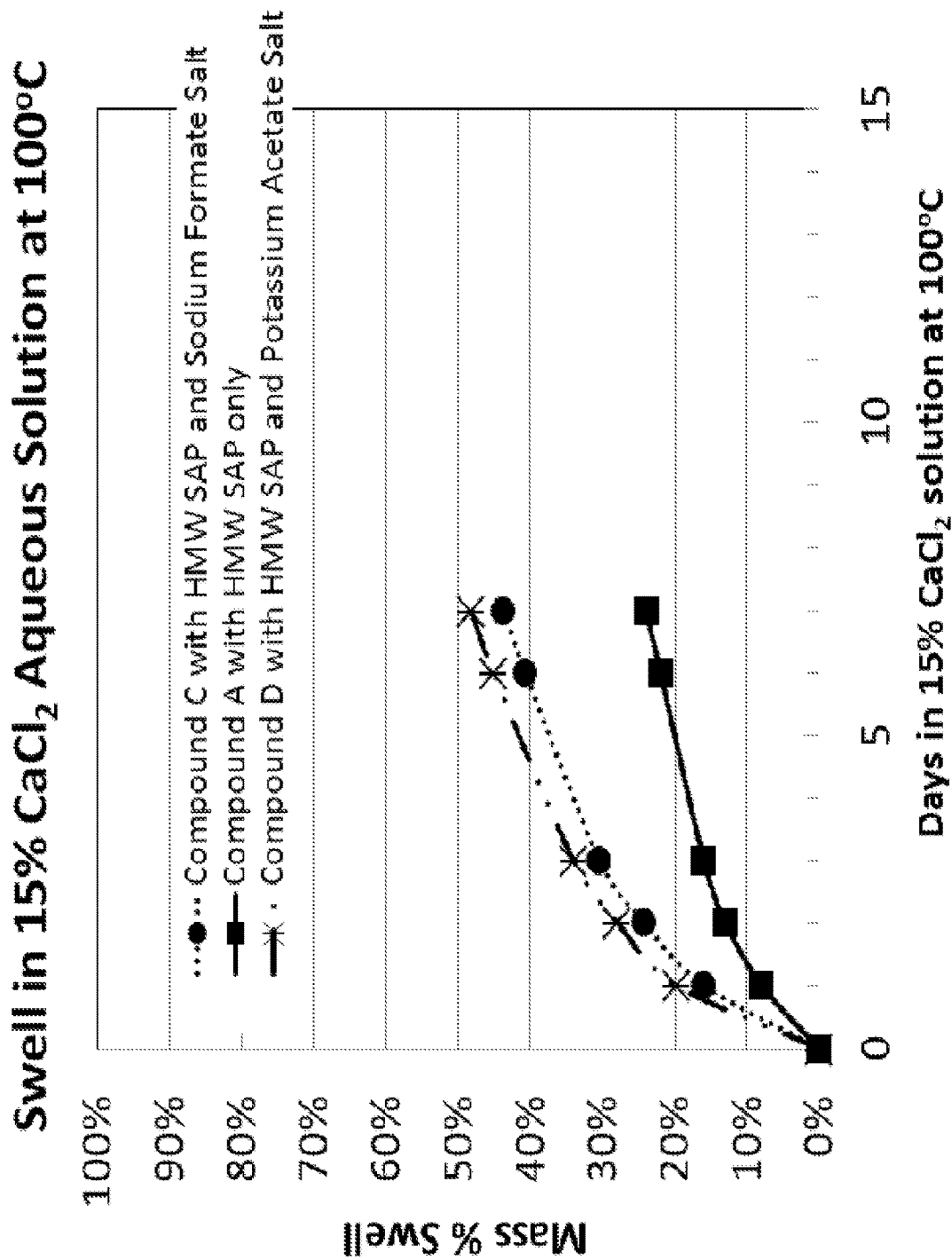
FIG. 3C depicts swelling data for Comparative Example 3 and Example 3 in a 15 wt. % CaCl$_2$ brine.

Referring now to FIG. 3C, the swellable Example 3a and Example 3b versus Comparative Example 3b in a 15 wt. % calcium chloride ($CaCl_2$) brine. The data show that the composition of Example 3a including 80 phr of a high molecular weight swelling agent and 15 phr of the first low molecular weight swelling agent had about an 85% increase in swelling after 7 days, while the composition of Example 3b including 80 phr of a high molecular weight swelling agent and 15 phr of the second low molecular weight swelling agent had about a 100% after 7 days.

Comparative Example 4 and Example 4

This example illustrates the preparation of a Comparative Example 4 and Example 4 and their test results. Table IV tabulates the ingredients used to prepare Comparative Example 4 and Example 4.

TABLE IV

Compositions of Comparative Example 4, Example 4a and Example 4b

| Component | Ingredient | Comparative Example 4 | Example 4 |
|---|---|---|---|
| Elastomer | NBR | 100 phr | 100 phr |
| Cure System | Weatherford Proprietary* | | Proprietary |
| Additives | Weatherford Proprietary* | | Proprietary |
| HMW SAP | Sodium Polyacrylate | 80 phr | 80 phr |
| LMW Salt | Sodium Carbonate | 0 phr | 10 phr |

*the cure system and additives are available from Weatherford International of Houston, Texas Comparative Example 5 and Example 5

This example illustrates the preparation and testing of a Comparative Example 5 and Example 5 and their test results. Table V tabulates the ingredients used to prepare Comparative Example 5 and Example 5.

TABLE V

Compositions of Comparative Example 5, Example 5a and Example 5b

| Component | Ingredient | Comparative Example 5 | Example 5 |
|---|---|---|---|
| Elastomer | Hydrogenated NBR | 100 phr | 100 phr |
| Cure System | Weatherford Proprietary* | | Proprietary |
| Additives | Weatherford Proprietary* | | Proprietary |
| HMW SAP | Sodium Polyacrylate | 60 phr | 50 phr |
| LMW Salt | Potassium Acetate | 0 phr | 10 phr |

*the cure system and additives are available from Weatherford International of Houston, Texas Comparative Example 6 and Example 6

This example illustrates the preparation and testing of a Comparative Example 6 and Example 6 and their test results. Table VI tabulates the ingredients used to prepare Comparative Example 6 and Example 6.

TABLE VI

Compositions of Comparative Example 6, Example 6a and Example 6b

| Component | Ingredient | Comparative Example 6 | Example 6 |
|---|---|---|---|
| Elastomer | NBR | 100 phr | 100 phr |
| Cure System | Weatherford Proprietary* | | Proprietary |
| Additives | Weatherford Proprietary* | | Proprietary |
| HMW SAP | Sodium Polyacrylate | 100 phr | 80 phr |
| LMW Salt | Potassium Formate | 0 phr | 20 phr |

*the cure system and additives are available from Weatherford International of Houston, Texas Comparative Example 7 and Example 7

This example illustrates the preparation and testing of a Comparative Example 7 and Example 7 and their test results. Table VII tabulates the ingredients used to prepare Comparative Example 7 and Example 7.

TABLE VII

Compositions of Comparative Example 7, Example 7a and Example 7b

| Component | Ingredient | Comparative Example 7 | Example 7 |
|---|---|---|---|
| Elastomer | FKM elastomer | 100 phr | 100 phr |
| Cure System | Weatherford Proprietary* | | Proprietary |
| Additives | Weatherford Proprietary* | | Proprietary |
| HMW SAP | Sodium Polyacrylate | 100 phr | 70 phr |
| LMW Salt | Sodium Chloride | 0 phr | 30 phr |

*the cure system and additives are available from Weatherford International of Houston, Texas Comparative Example 8 and Example 8

This example illustrates the preparation and testing of a Comparative Example 8 and Example 8 and their test results. Table VIII tabulates the ingredients used to prepare Comparative Example 8 and Example 8.

TABLE VIII

Compositions of Comparative Example 8 and Example 8

| Component | Ingredient | Comparative Example 8 | Example 8 |
|---|---|---|---|
| Elastomer | EPDM | 100 phr | 100 phr |
| Cure System | Weatherford Proprietary* | | Proprietary |
| Additives | Weatherford Proprietary* | | Proprietary |
| HMW SAP | Sodium Polyacrylate | 100 phr | 80 phr |
| LMW Salt | Potassium Formate | 0 phr | 10 phr |
| LMW Salt | Sodium Formate | 0 phr | 10 phr |

*the cure system and additives are available from Weatherford International of Houston, Texas Comparative Example 9 and Example 9

This example illustrates the preparation Comparative Example 9 and Example 9 and their test results. Table IX tabulates the ingredients used to prepare Comparative Example 9 and Example 9.

TABLE IX

Compositions of Comparative Example 9 and Example 9

| Component | Ingredient | Comparative Example 9 | Example 9 |
|---|---|---|---|
| Elastomer | EPDM | 100 phr | 100 phr |
| Cure System | Weatherford Proprietary* | Proprietary | Proprietary |
| Additives | Weatherford Proprietary* | Proprietary | Proprietary |
| HMW SAP | Poly(acrylamide-co-acrylic acid) Potassium | 50 phr | 50 phr |
| HMW SAP | Sodium Polyacrylate | 50 phr | 50 phr |
| LMW Salt | Potassium Formate | 0 phr | 10 phr |
| LMW Salt | Sodium Formate | 0 phr | 10 phr |

*the cure system and additives are available from Weatherford International of Houston, Texas Examples 4-9 also showed increased swellability for different high molecular weight swelling agents and different low molecular weight swelling agents, clearly demonstrating that versatility of swellable elastomeric compositions including a combination of at least one high molecular weight swelling agent and at least one low molecular weight swelling agent.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A swellable system consisting of:
   100 parts of at least one curable elastomer selected from the group consisting of nitrile-butadiene rubber (NBR); hydrogenated NBR (hNBR); chemically functionalized NBR; ethylene-propylene-diene-copolymer (EPDM); ethylene-propylene rubber (EPR); fluorinated elastomers; styrene-butadiene rubber (SBR); hydrogenated styrene-butadiene rubber (hSBR); isoprene-butadiene rubber (IBR); hydrogenated isoprene-butadiene rubber (hIBR); styrene-isoprene rubber (SIR); hydrogenated styrene-isoprene rubber (hSIR); styrene-butadiene-isoprene (SIBR); hydrogenated styrene-butadiene-isoprene rubber (hSIBR); block, triblock and multi-block polymers of styrene-isoprene, styrene-butadiene, styrene-butadiene-isoprene thermoplastic elastomers; hydrogenated block, triblock and multi-block polymers of styrene-isoprene, styrene-butadiene, styrene-butadiene-isoprene thermoplastic elastomers; silicone rubbers; and mixtures thereof, wherein the swellable system comprises no additional elastomer;
   10 parts to 150 parts of at least one high molecular weight (HMW) swelling agent; and
   3 parts to 70 parts of at least one low molecular weight (LMW) swelling agent; and
   optionally an additive selected from the group consisting of a filler, a cure system, a co-cure agent that forms ionic crosslinks, an antioxidant, a flame retardant, and any combination thereof, wherein the filler is selected from the group consisting of carbon black, silica, and clay, and wherein the cure system comprises peroxides, sulfurs, sulfur-donors, amines, phenolic resins, metal oxides, or mixtures thereof.

2. The system of claim 1, wherein the LMW swelling agent is selected from the group consisting of halide salts, hydroxide salts, carbonate salts, formate salts, acetate salts, phosphate salts, triphosphate salts, polyphosphate salts, sulfate salts, perchlorate salts, citrate salts, oxylate salts, and mixtures thereof, and
wherein the HMW swelling agent comprises a high molecular weight hydrogel, a high molecular weight superabsorbent polymer (HMW SAP), a high molecular weight ionomer, or mixtures thereof.

3. The system of claim 1, wherein:
the LMW swelling agents are selected from the group consisting of sodium acetate, potassium acetate, calcium acetate, sodium formate, potassium formate, calcium formate, ammonium triphosphate, sodium triphosphate, potassium triphosphate, calcium triphosphate, ammonium perchlorate, sodium perchlorate, potassium perchlorate, ammonium polyphosphate, sodium polyphosphate, potassium polyphosphate, ammonium sodium acrylate, potassium acrylate, sodium carbonate, potassium carbonate, ammonium hydroxide, sodium hydroxide, potassium hydroxide, and mixtures thereof, and
the HMW swelling agent is selected from the group consisting of sodium polyacrylates, potassium polyacrylates, sodium polymethacrylates, potassium polymethacrylates, poly(acryl amide-co-acrylic acid) sodium salt, poly(acryl amide-co-acrylic acid) potassium salt, poly(acryl amide-co-acrylic acid) sodium salt and potassium salt, 2-acrylamido-2-methylpropane sulfonic acid (AMPS), and mixtures thereof.

4. A method for preparing a swellable composition comprising the steps of:
mixing components consisting of 100 parts of at least one curable elastomer, 10 parts to 150 parts of at least one high molecular weight (HMW)swelling agent and 3 parts to 70 parts of at least one low molecular weight (LMW) swelling agent, a cure system during conditions sufficient to form a swellable composition, and optionally an additive selected from the group consisting of a filler, a co-cure agent that forms ionic crosslinks, an antioxidant, a flame retardant, and any combination thereof, wherein the filler is selected from the group consisting of carbon black, silica, and clay, and wherein the cure system comprises peroxides, sulfurs, sulfur-donors, amines, phenolic resins, metal oxides, or mixtures thereof,
wherein the curable elastomer is selected from the group consisting of nitrile-butadiene rubber (NBR); hydrogenated NBR (hNBR); chemically functionalized NBR; ethylene-propylene-diene-copolymer (EPDM); ethylene-propylene rubber (EPR); fluorinated elastomers; styrene-butadiene rubber (SBR); hydrogenated styrene-butadiene rubber (hSBR); isoprene-butadiene rubber (IBR); hydrogenated isoprene-butadiene rubber (hIBR); styrene-isoprene rubber (SIR); hydrogenated styrene-isoprene rubber (hSIR); styrene-butadiene-isoprene (SIBR); hydrogenated styrene-butadiene-isoprene rubber (hSIBR); block, triblock and multi-block polymers of styrene-isoprene, styrene-butadiene, styrene-butadiene-isoprene thermoplastic elastomers; hydrogenated block, triblock and multi-block polymers of styrene-isoprene, styrene-butadiene, styrene-butadiene-isoprene thermoplastic elastomers; silicone rubbers; and mixtures thereof,
wherein the swellable composition comprises no additional elastomer; and
curing the swellable composition to form a cured swellable composition, where the cure system is present in an amount sufficient to cure the at least one curable elastomer to a desired cure level or state of cure.

5. The method of claim 4, wherein the LMW swelling agent is selected from the group consisting of halide salts, hydroxide salts, carbonate salts, formate salts, acetate salts, phosphate salts, triphosphate salts, polyphosphate salts, sulfate salts, perchlorate salts, citrate salts, oxylate salts, and mixtures thereof; and
wherein the HMW swelling agent comprises a high molecular weight hydrogel, a high molecular weight superabsorbent polymer (HMW SAP), a high molecular weight ionomer, or mixtures thereof.

6. The method of claim 4, wherein the LMW swelling agent is selected from the group consisting of sodium acetate, potassium acetate, calcium acetate, sodium formate, potassium formate, calcium formate, ammonium triphosphate, sodium triphosphate, potassium triphosphate, calcium triphosphate, ammonium perchlorate, sodium perchlorate, potassium perchlorate, ammonium polyphosphate, sodium polyphosphate, potassium polyphosphate, ammonium sodium acrylate, potassium acrylate, sodium carbonate, potassium carbonate, ammonium hydroxide, sodium hydroxide, potassium hydroxide, and mixtures thereof.

7. The method of claim 4, wherein the HMW swelling agent is selected from the group consisting of sodium polyacrylates, potassium polyacrylates, sodium polymethacrylates, potassium polymethacrylates, poly(acryl amide-co-acrylic acid) sodium salt, poly(acryl amide-co-acrylic acid) potassium salt, poly(acryl amide-co-acrylic acid) sodium salt and potassium salt, 2-acrylamido-2-methylpropane sulfonic acid (AMPS), and mixtures thereof.

8. A swellable construct for use in downhole applications, where the swellable construct is made from a swellable composition consisting of 100 parts of at least one curable elastomer, 10 parts to 150 parts of at least one high molecular weight (HMW) swelling agent, 3 parts to 70 parts of at least one low molecular weight (LMW) swelling agent, a cure system during conditions sufficient to form a cured swellable composition, and optionally an additive selected from the group consisting of a filter, a cure system, a co-cure agent that forms ionic crosslinks, an antioxident, a flame retardant, and any combination thereof, wherein the filler is selected from the group consisting of carbon black, silica, and clay, and wherein the cure system comprises peroxides, sulfurs, sulfur-donors amines, phenolic resins, metal oxides, or mixtures thereof,
wherein the curable elastomer is selected from the group consisting of nitrile-butadiene rubber (NBR); hydrogenated NBR (hNBR); chemically functionalized NBR; ethylene-propylene-diene-copolymer (EPDM); ethylene-propylene rubber (EPR); fluorinated elastomers; styrene-butadiene rubber (SBR); hydrogenated styrene-butadiene rubber (hSBR); isoprene-butadiene rubber (IBR); hydrogenated isoprene-butadiene rubber (hIBR); styrene-isoprene rubber (SIR); hydrogenated styrene-isoprene rubber (hSIR); styrene-butadiene-isoprene (SIBR); hydrogenated styrene-butadiene-isoprene rubber (hSIBR); block, triblock and multi-block polymers of styrene-isoprene, styrene-butadiene, styrene-butadiene-isoprene thermoplastic elastomers; hydrogenated block, triblock and multi-block polymers of styrene-isoprene, styrene-butadiene, styrene-butadiene-isoprene thermoplastic elastomers; silicone rubbers; and mixtures thereof, and
wherein the swellable composition comprises no additional elastomer.

9. The swellable construct of claim 8, wherein the LMW swelling agents are selected from the group consisting of halide salts, hydroxide salts, carbonate salts, formate salts, acetate salts, phosphate salts, triphosphate salts, polyphosphate salts, sulfate salts, perchlorate salts, citrate salts, oxylate salts, and mixtures thereof; and
wherein the HMW swelling agent comprises a high molecular weight hydrogel, a high molecular weight superabsorbent polymer (HMW SAP), a high molecular weight ionomer, or mixtures thereof.

10. The swellable construct of claim 8, wherein:
the LMW swelling agent is selected from the group consisting of sodium acetate, potassium acetate, calcium acetate, sodium formate, potassium formate, calcium formate, ammonium triphosphate, sodium triphosphate, potassium triphosphate, calcium triphosphate, ammonium perchlorate, sodium perchlorate, potassium perchlorate, ammonium polyphosphate, sodium polyphosphate, potassium polyphosphate, ammonium sodium acrylate, potassium acrylate, sodium carbonate, potassium carbonate, ammonium hydroxide, sodium hydroxide, potassium hydroxide, and mixtures thereof, and
the HMW swelling agent is selected from the group consisting of sodium polyacrylates, potassium polyacrylates, sodium polymethacrylates, potassium polymethacrylates, poly(acryl amide-co-acrylic acid) sodium salt, poly(acryl amide-co-acrylic acid) potassium salt, poly(acryl amide-co-acrylic acid) sodium salt and potassium salt, 2-acrylamido-2-methylpropane sulfonic acid (AMPS), and mixtures thereof.

11. The swellable construct of claim 8, wherein the swellable construct is selected from the group consisting of a zonal isolation tool elastomeric element, a packer element, a blow out preventer element, a self-healing cement, a proppant, an O-ring, a T-ring, an electric submersible pump protector, a centralizer, a hanger, a plug, a plug catcher, a check valve, an universal valve, a spotting valve, a differential valve, a circulation valve, an equalizing valve, a safety valve, a fluid flow control valve, a connector, a disconnect tool, a downhole filter, a motor head, a retrieval and fishing tool, a bottom hole assembly, a seal assembly, a snap latch assembly, an anchor latch assembly, a shear-type anchor latch assembly, and a no-go locator.

12. The system of claim 1, wherein there are 50 parts to 120 parts of the at least one HMW swelling agent and from 5 parts to 30 parts of the at least one LMW swelling agent.

13. The construct of claim 8, wherein there are from 50 parts to 120 parts of the at least one HMW swelling agent and from 5 parts to 30 parts of the at least one LMW swelling agent.

* * * * *